US009813775B2

(12) United States Patent
Joong et al.

(10) Patent No.: US 9,813,775 B2
(45) Date of Patent: Nov. 7, 2017

(54) HYBRID STORAGE OF PROGRAM RECORDINGS IN A SERVICE PROVIDER NETWORK

(71) Applicant: Telefonaktiebolaget L M Ericsson (Publ), Stockholm (SE)

(72) Inventors: Donald Joong, Montreal (CA); Ganish Katyal, Saint-Laurent (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 129 days.

(21) Appl. No.: 14/155,533

(22) Filed: Jan. 15, 2014

(65) Prior Publication Data
US 2015/0201248 A1 Jul. 16, 2015

(51) Int. Cl.
H04N 7/173 (2011.01)
H04N 21/63 (2011.01)
H04N 21/218 (2011.01)
H04N 21/232 (2011.01)
H04N 21/2747 (2011.01)
H04N 21/61 (2011.01)
H04N 21/4147 (2011.01)
(Continued)

(52) U.S. Cl.
CPC ........... H04N 21/632 (2013.01); H04N 7/173 (2013.01); H04N 21/2181 (2013.01); H04N 21/21815 (2013.01); H04N 21/232 (2013.01); H04N 21/23113 (2013.01); H04N 21/2747 (2013.01); H04N 21/4147 (2013.01); H04N 21/6125 (2013.01); H04N 21/6175 (2013.01); H04N 21/64 (2013.01)

(58) Field of Classification Search
CPC ............................... H04N 21/47202
See application file for complete search history.

(56) References Cited

U.S. PATENT DOCUMENTS

2007/0039033 A1 2/2007 Ota
2008/0046954 A1 2/2008 Bhogal et al.
2009/0077614 A1 3/2009 White et al.
(Continued)

FOREIGN PATENT DOCUMENTS

CN 101489109 A1 7/2009

OTHER PUBLICATIONS

International Search Report and Written Opinion dated May 5, 2015 for International Application Serial No. PCT/IB2015/050288, International Filing Date: Jan. 14, 2015 consisting of 11-pages.
(Continued)

Primary Examiner — Gigi L Dubasky
(74) Attorney, Agent, or Firm — Christopher & Weisberg, P.A.

(57) ABSTRACT

A method of managing, by a service provider, a program stored within a service provider network. Multiple multimedia devices are in communication with the service provider network. In accordance with one embodiment, a method for managing, by a service provider, a program stored within a service provider network includes determining a first number of subscriptions for the program. If the first number of subscriptions is less than a first threshold, at least a portion of the program is transmitted to at least a first multimedia device having a subscription for the program and the program is removed from the service provider network.

17 Claims, 6 Drawing Sheets

(51) Int. Cl.
*H04N 21/64* (2011.01)
*H04N 21/231* (2011.01)

(56) References Cited

U.S. PATENT DOCUMENTS

| | | | |
|---|---|---|---|
| 2009/0106393 A1* | 4/2009 | Parr et al. | 709/218 |
| 2009/0300096 A1* | 12/2009 | Koonce et al. | 709/203 |
| 2012/0079191 A1 | 3/2012 | Jaquette | |
| 2013/0204961 A1* | 8/2013 | Fliam | H04L 67/2885 709/214 |
| 2013/0246564 A1* | 9/2013 | Lee | H04L 67/2842 709/217 |

OTHER PUBLICATIONS

Chung, et al.—"A Scalable PVR-based Content Sharing Architecture for Community Networks", IEEE Transactions on Consumer Electronics, vol. 54, No. 3, Aug. 2008, consisting of 8-pages.

\* cited by examiner

HYBRID STORAGE OF PROGRAM RECORDINGS IN A SERVICE PROVIDER NETWORK

TECHNICAL FIELD

The present invention relates to methods and apparatus for managing program content, and more specifically, to managing storage of program content by a service provider network.

BACKGROUND

Internet Protocol television (IPTV) is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television (CATV) formats.

IPTV services may be classified into three main groups: (1) Linear television, with or without interactivity related to the current TV show; (2) Time-shifted programming for catch-up TV (replays a TV show that was broadcast hours or days ago), and start-over TV (replays the current TV show from its beginning); and (3) Video on Demand (VOD) for browsing a catalog of videos, not related to TV programming.

IPTV is distinguished from general Internet-based or web-based multimedia services by its on-going standardization process, e.g., European Telecommunications Standards Institute, and preferential deployment scenarios in subscriber-based telecommunications networks with high-speed access channels into end-subscriber premises via set-top boxes or other customer-premises equipment.

Personal Video Recorder (PVR) is a generic term for a device that records television data in digital format. For example, a PVR may encode video data in MPEG-1 or MPEG-2 format and store the data in a hard drive. Common functions of a PVR allow the subscribers to record, playback, fast forward, rewind and pause the playback of content.

Additionally a PVR provides an ability to instantly jump to any part of a program without having to rewind or fast forward the data stream. The PVR function can be hosted locally by the STBs (LPVR) or externally by network functional entities, Network Personal Video Recorder (NPVR).

For NPVR systems, it may not be practical for the network service provider to maintain a copy of a PVR program on a service provider server or storage device for a single or a limited number of relatively few subscribers. In some markets, network personal video recorder, NPVR, solutions may store a single copy of a recorded program and share it amongst all subscribers who had intended to record it. This implies that the system must maintain a list of subscribers associated to each personal video recording, PVR. The system will never purge a recorded program as long as there is at least one subscriber who still has the PVR as part of their recording library.

Thus, in systems with a large number of subscribers, it is likely that a system may never be able to purge or delete any of its network recorded programming because there will likely always be at least one subscriber who still has the programming as part of his recording library. It may be impractical for the NPVR system to maintain a recording in a central server for a single subscriber or a few subscribers.

SUMMARY

The present invention relates to managing, by a service provider, a program stored within a service provider network. Multiple multimedia devices are in communication with the service provider network. In accordance with one embodiment, a method for managing, by a service provider, a program stored within a service provider network includes determining a first number of subscriptions for the program. If the first number of subscriptions is less than a first threshold, at least a portion of the program is transmitted to at least a first multimedia device having a subscription for the program and the program is removed from the service provider network.

In accordance with an aspect of this embodiment, an address of the first multimedia device is stored. Responsive to a request for the program from a second multimedia device, the address of the first multimedia device having at least a portion of the program is provided to the second multimedia device.

In accordance with another aspect of this embodiment, transmitting at least a portion of the program to at least the first multimedia device includes transmitting a first portion of the program to a second multimedia device having a subscription for the program, and transmitting a second portion of the program to a third multimedia device having a subscription for the program. In accordance with yet another aspect of this embodiment, the first portion is identical to the second portion, the first portion and the second portion including an entirety of the program. In accordance with still another aspect of this embodiment, the first portion is different than the second portion.

In accordance with an aspect of this embodiment, a second number of subscriptions is determined for the program, and if the second number is greater than a second threshold, the program is stored within the service provider network, whereby the second threshold is greater than the first threshold. In accordance with another aspect of this embodiment, storing the program within the service provider network includes receiving at least a portion of the program from at least one multimedia device having one of the first number of subscriptions for the program.

In accordance with another embodiment, an apparatus for managing a program in a service provider network is provided. The apparatus is configured to communicate with the service provider network. Multiple multimedia devices are in communication with the service provider network, and the program is stored within the service provider network. The apparatus includes a processor configured to determine a first number of subscriptions for the program. If the first number of subscriptions is less than a first threshold, the processor is configured to transmit at least a portion of the program to at least a first multimedia device having a subscription for the program, and remove the program from the service provider network.

In accordance with an aspect of this embodiment, the processor is further configured to store an address of the first multimedia device in the service provider network.

In accordance with another aspect of this embodiment, the processor is further configured to receive a request for the program from a second multimedia device. In response to receiving the request, the processor is configured to provide the address of the first multimedia device to the second multimedia device.

In accordance with yet another aspect of this embodiment, the processor is further configured to receive a request for the program from a second multimedia device. In response to receiving the request, the processor is further configured to instruct the first multimedia device to transmit the program to the second multimedia device.

In accordance with still another aspect of this embodiment, the processor is further configured to transmit a first portion of the program to a second multimedia device, and transmit a second portion of the program to a third multimedia device.

In accordance with an aspect of this embodiment, the processor is further configured to determine a second number of subscriptions for the program. If the second number is greater than a second threshold whereby the second threshold is greater than the first threshold, the processor is further configured to store the program at the service provider network. In accordance with another aspect of this embodiment, the processor is further configured to receive at least a portion of the stored program from at least one multimedia device having one of the first number of subscriptions for the program.

In accordance with another embodiment, a method is provided of managing, by a service provider, a program within a service provider network. The service provider network has multiple multimedia devices in communication with the service provider network. The method includes determining a first number of subscriptions for the program. If the first number of subscriptions is less than a first threshold, at least a portion of the program is recorded on at least a first multimedia device having a subscription for the program without storing the program at the network provider.

In accordance with an aspect of this embodiment, a second number of subscriptions for the program is determined. If the second number is greater than a second threshold whereby the second threshold is greater than the first threshold, the program is stored within the service provider network. In accordance with another aspect of this embodiment, storing the program at the service provider network includes receiving at least a portion of the program from the first multimedia device having the subscription for the program.

In accordance with yet another aspect of this embodiment, an address of the first multimedia device is stored. Responsive to a request for the program from a second multimedia device, the address of the first multimedia device is provided to the second multimedia device, whereby the first multimedia device having at least a portion of the program. In accordance with still another aspect of this embodiment, responsive to a request for the program from a second multimedia device, the first multimedia device is instructed to transmit at least a portion of the program to one of the second multimedia device and the service provider network. In accordance with an aspect of this embodiment, a second number of subscriptions for the program is determined. If the second number is less than a second threshold whereby the second threshold is less than the first threshold, the program is stored within the service provider network.

DETAILED DESCRIPTION

Figure 1:
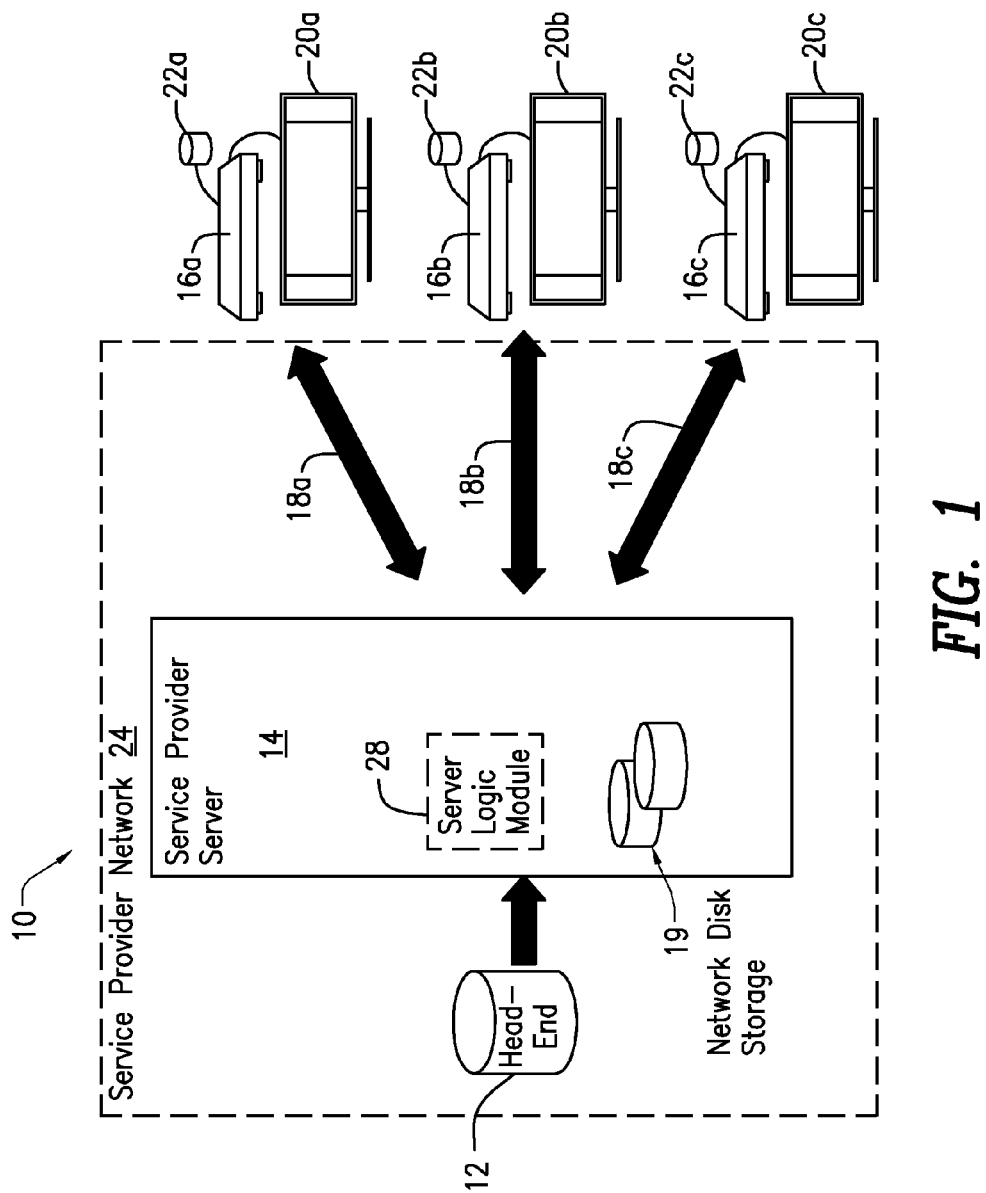
FIG. 1 is a block diagram of an exemplary multimedia system constructed in accordance with principles of the present invention.

Before describing in detail exemplary embodiments that are in accordance with the present invention, it is noted that the embodiments reside primarily in combinations of apparatus components and processing steps related to identifying and storing a program media on a personal video recorder (PVR). Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In embodiments described herein, the joining term, "in communication with" and "connected to," and the like, may be used to indicate electrical and data communication, which may be accomplished by physical contact, induction, electromagnetic radiation, radio signaling, infrared signaling or optical signaling, for example. The above methods of achieving electrical and data communication are non-limiting and mentioned only for illustration. One having ordinary skill in the art will appreciate that multiple components may interoperate and modifications and variations are possible of achieving the electrical and data communication.

Referring to the drawing figures in which like reference designators refer to like elements, FIG. 1 shows a multimedia system 10 according to an exemplary embodiment of the present invention. The multimedia system 10 includes a head-end 12 in communication with a service provider server 14. The head-end 12 receives television signals, e.g., programming signals, and processes the signals for distribution. The service provider server 14 is in communication with the head-end 12 and provides subscriber-level functionality including, for example, Internet protocol television (IPTV) service. The service provider server 14 may be a gateway device that is in communication with multiple multimedia devices 16a, 16b, 16c (hereinafter collectively referred to as "multimedia device 16") and transmits multimedia data on transport streams 18a, 18b, 18c (hereinafter collectively referred to as "transport stream 18") to a respective multimedia device 16.

The service provider server 14 may include or otherwise be in communication with network storage 19, which includes transitory and non-transitory storage. According to some exemplary embodiments, network storage 19 may be in communication with, and connected to, the service provider server 14. The network storage 19 may be a virtualized enterprise storage implemented across pools of storage hardware that may span multiple locations, for example. According to some exemplary embodiments, the network storage 19 may include cloud storage.

The multimedia device 16 may be in communication with a respective display 20a, 20b, 20c (hereinafter collectively referred to as "display 20") that is arranged to display program content to a user. The multimedia device 16 also includes and/or is in communication with a local storage device 22a, 22b, 22c (hereinafter collectively referred to as "storage device 22"), which provides transitory and non-transitory data storage for the multimedia device 16. According to some exemplary embodiments of the present invention, the multimedia device 16 may receive media from one or more media sources including the head end 12, the service provider server 14 via the transport stream 18, and the local storage device 22. According to some exemplary embodiments, the multimedia device 16 may include a set top box, such as an IPTV set top box, that provides multimedia content and electronic programming functionality to a user/subscriber. The multimedia device 16 may be capable of live-play video recording (LPVR). Although FIG. 1 shows the multimedia devices 16 in communication with the service provider server 14 via the transport streams 18, the present invention is not limited to this arrangement. It will be appreciated that a multimedia device 16, e.g., the multimedia device 16a, may be in communication with other multimedia devices 16, e.g., the multimedia device 16b, via the transport stream 18 and/or other communication connections inside and outside the service provider network 24. In other words, it is contemplated that that the multimedia devices 16 can communicate with one another without communications having to flow directly through the service provider server 14.

Figure 2:
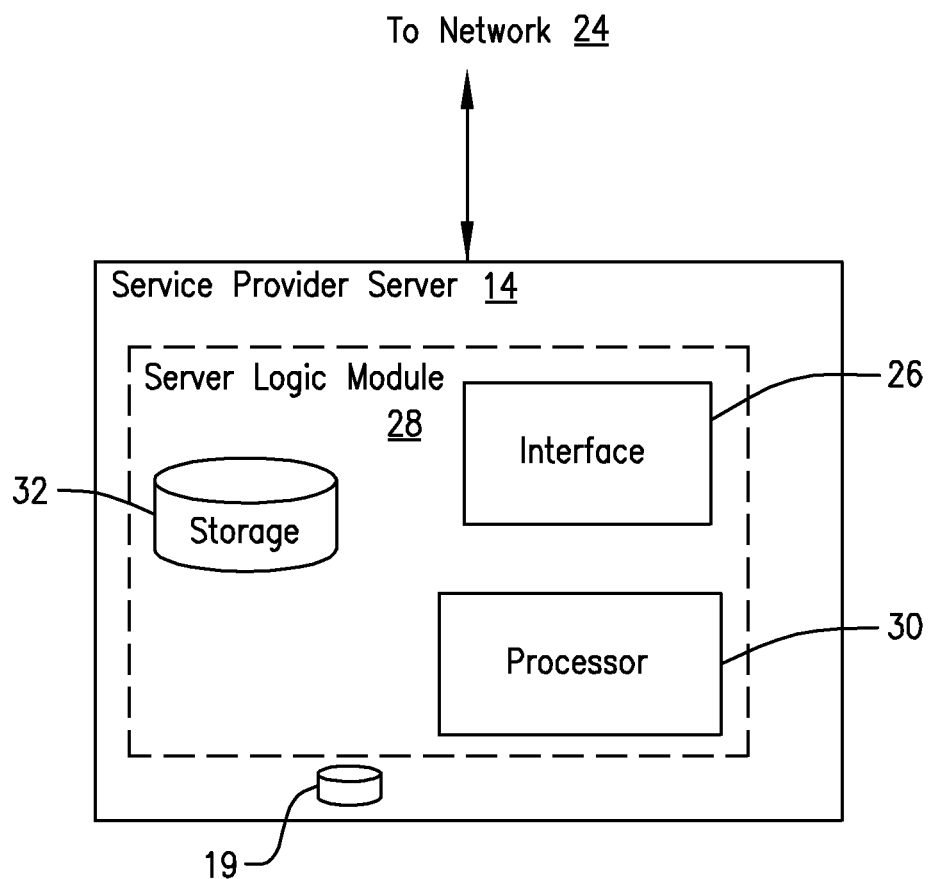
FIG. 2 is a block diagram of an exemplary service provider server constructed in accordance with the principles of the present invention.

An exemplary service provider server 14 is disclosed with reference to FIG. 2. The service provider server 14 includes a media interface 26 that enables communication between the service provider server 14 and other components in the service provider network 24 including, for example, the head-end 12, and with the multimedia device 16. For clarity, a single media interface 26 is shown. It will be appreciated, however, that the media interface 26 may include multiple interfaces that allow the service provider server 14 to communicate with multiple components of the service provider network and/or devices. Service provider server 14 may implement functionality that may be collectively referred to as a server logic module 28. According to some exemplary embodiments, aspects of the service provider server 14 may be implemented in hardware on a processor 30 or as a combination of hardware and software. Aspects of the service provider server 14 include an implementation of the server logic module 28. Computer-readable program code to implement aspects of the service provider server 14 including functions of the logic module 30 may be stored in storage 32.

Figure 3:
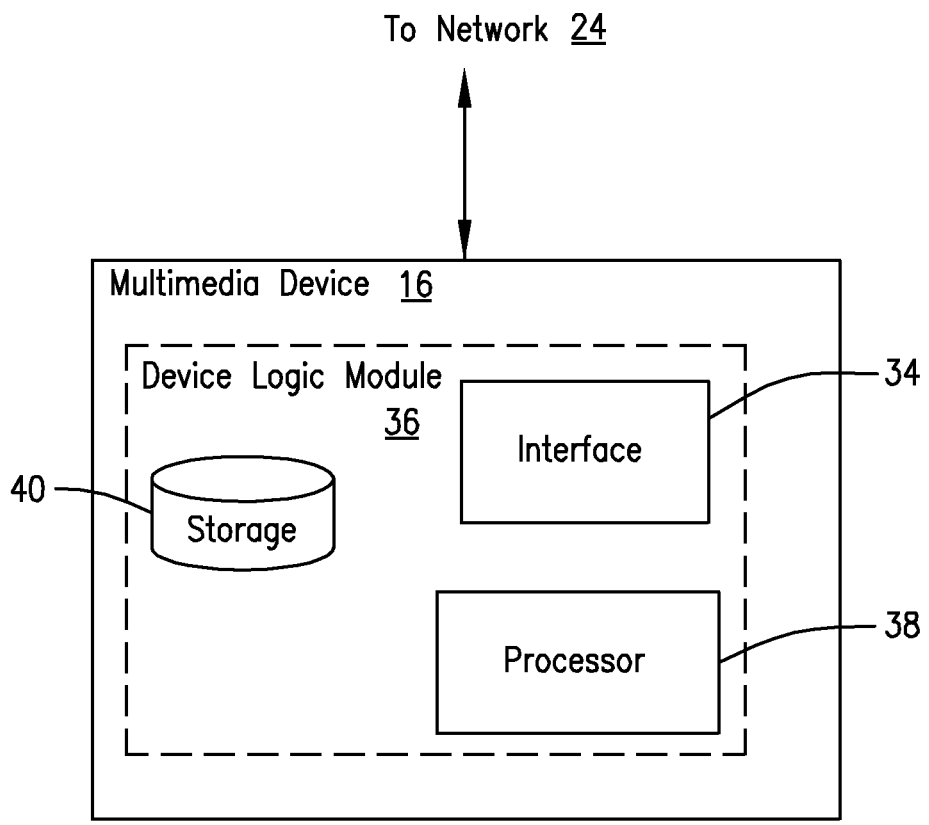
FIG. 3 is a block diagram of an exemplary multimedia device constructed in accordance with the principles of the present invention.

An exemplary multimedia device 16 is discussed with reference to FIG. 3. The multimedia device 16 includes a media interface 34 that enables communication between the multimedia device 16 and other components in the service provider network 24 including, for example, the service provider server 14 and the network storage 19 as shown in FIGS. 1 and 2, and other multimedia devices 16 connected to the service provider network 24. The media interface 34 may also enable communication between the multimedia device 16 and the display 20 and the local disk storage 22. For clarity, a single media interface 34 is shown. It will be appreciated, however, that the media interface 34 may include multiple interfaces that allow the multimedia device 16 to communicate with multiple components of the service provider network and/or devices. The multimedia device 16 may implement functionality that may be collectively referred to as a device logic module 36. According to some exemplary embodiments, aspects of the multimedia device 16 may be implemented in hardware on a processor 38 or as a combination of hardware and software. Aspects of the multimedia device 16 include an implementation of the logic module 38. Computer-readable program code to implement aspects of the multimedia device 16 including functions of the device logic module 36 may be stored in storage 40.

It will be appreciated that the service provider server 14 and the multimedia device 16 may include additional hardware and/or software components that, for clarity, have are not shown.

Figure 4:
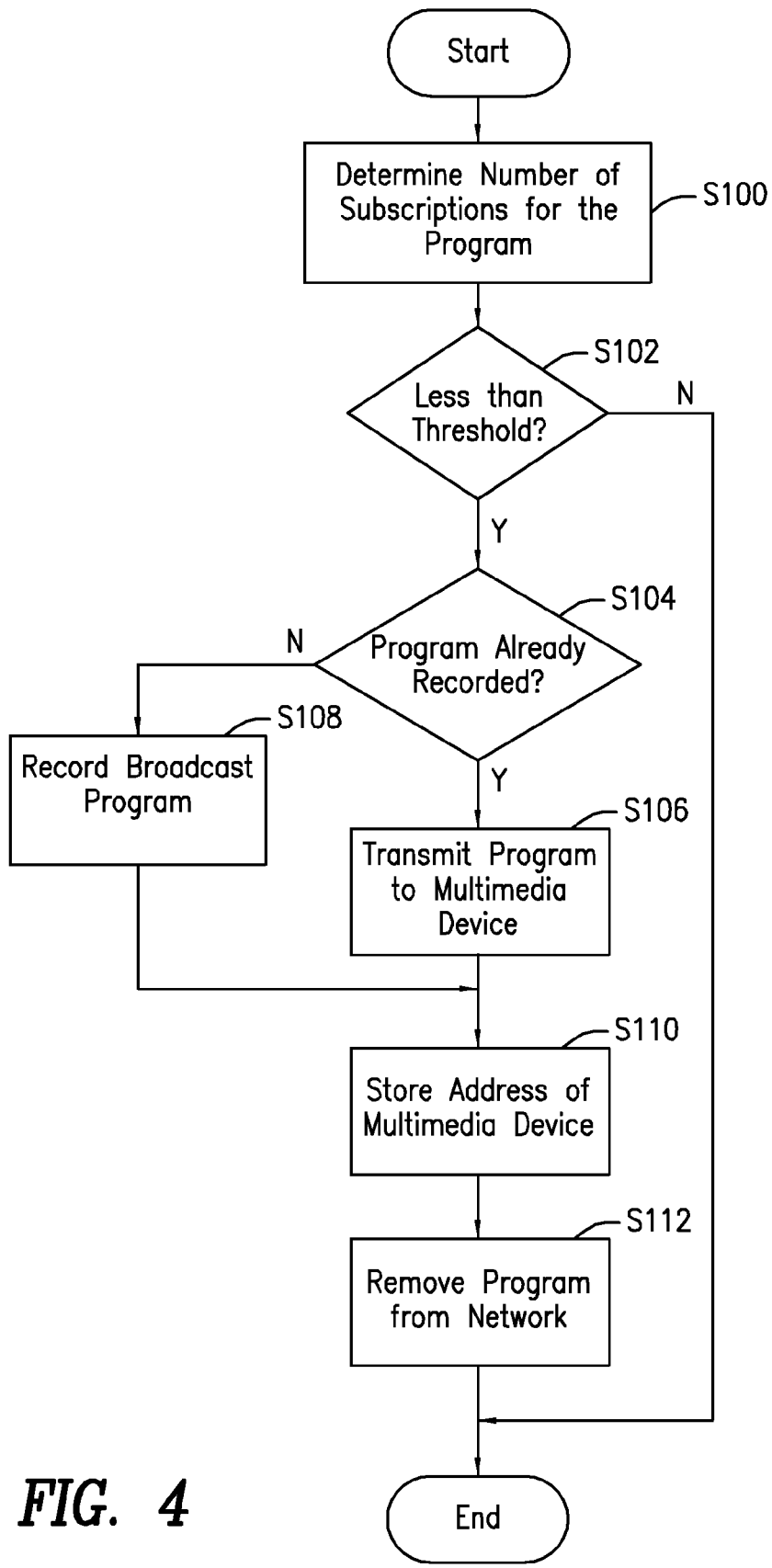
FIG. 4 is a flow chart of an exemplary process of managing a program stored within the storage of the service provider network in accordance with principles of the present invention.

An exemplary process for managing a program stored within the storage of the service provider network is described with reference to FIG. 4. The service provider server 14 initially determines a number of subscriptions for a program (block S100). It will be appreciated that, as used herein, "program" may without limitation refer to and include multimedia content, multimedia data, programming, electronic programming, a segment, an episode, a series, television, a broadcast, video and audio. It will be further appreciated that "program" may include a past program, i.e., previously recorded content, and/or a future program, i.e., content that has not yet been recorded. It will be appreciated that a "subscription" may include, for example, a one-time request for a program, a recurring request for the program, a request for an entire program series, and combinations thereof. The service provider server 14 determines whether the number of subscriptions is less than a predetermined first threshold value (block S102). The first threshold value may be determined based on a number of multimedia devices 16 that are connected to the service provider network 24, the storage capacity of the local storage 22 connected at the multimedia devices 16, the storage capacity in the network storage 19, a condition of the transport stream 18 between the multimedia devices 16 and the service provider network 24, and combinations thereof. The condition of the transport stream 18 between the multimedia devices 16 and the service provider network 24 may be determined based on, for example, measures of a bandwidth of the transport stream 18, a connection quality of the transport stream 18, e.g., error rate and signal to noise ratio, a volume of the transport stream 18 (transmission and reception) and combinations thereof.

If the number of subscriptions is less than the predetermined first threshold, the service provider server 14 determines whether the program is already recorded (block S104), i.e., whether the program is recorded in the network storage 19. If the service provider server 14 determines that the program is already recorded, the service provider server 14 transmits the program to a multimedia device 16 for storing on the local storage 22 of the multimedia device 16 (block S106).

If the service provider server 14 determines that the program is not already recorded, the service provider server 14 instructs the multimedia device 16 to record the broadcast program on the local storage 22 (block S108).

When transmitting the program to the multimedia device 16 (block S106) and instructing the multimedia device 16 to save the program (block S108), it will be appreciated that at least a portion of the program, i.e., a part of or an entirety of the program, may be stored at the multimedia device 16. The service provider server 14 stores an address of the multimedia device 16 where the at least a portion of the program is stored (block S110). According to some exemplary embodiments, the multimedia device 16 where the program, or portion thereof, is stored may or may not have a subscription for the stored program. The program, or portion thereof, may be stored on a particular multimedia device 16 that does not have a subscription for the program because utilizing the particular multimedia device 16, instead of a multimedia device 16 that does have a subscription for the program, may improve performance across the service provider network 24. The performance may be improved, for example, by having a more even distribution of network traffic among the multimedia devices 16 in the service provider network 24, utilizing available storage among available multimedia devices 16, or a higher band. It is also contemplated that the program can be broken into portions, with one or more portions being stored on multiple multimedia devices 16. For example, a first portion of the program can be transmitted to a multimedia device 16, e.g., multimedia device 16a, having a subscription for the program, and a second portion of the program can be transmitted to another multimedia device 16, e.g., multimedia device 16b, having a subscription for the program. The service provider server 14 then removes the program, if any, from the network storage 19 (block S112). When the program is removed from the network storage 19, the burden of storing the program is off-loaded from the service provider server 14 the network storage 19, and shifted to one or more multimedia devices 16.

Figure 5:
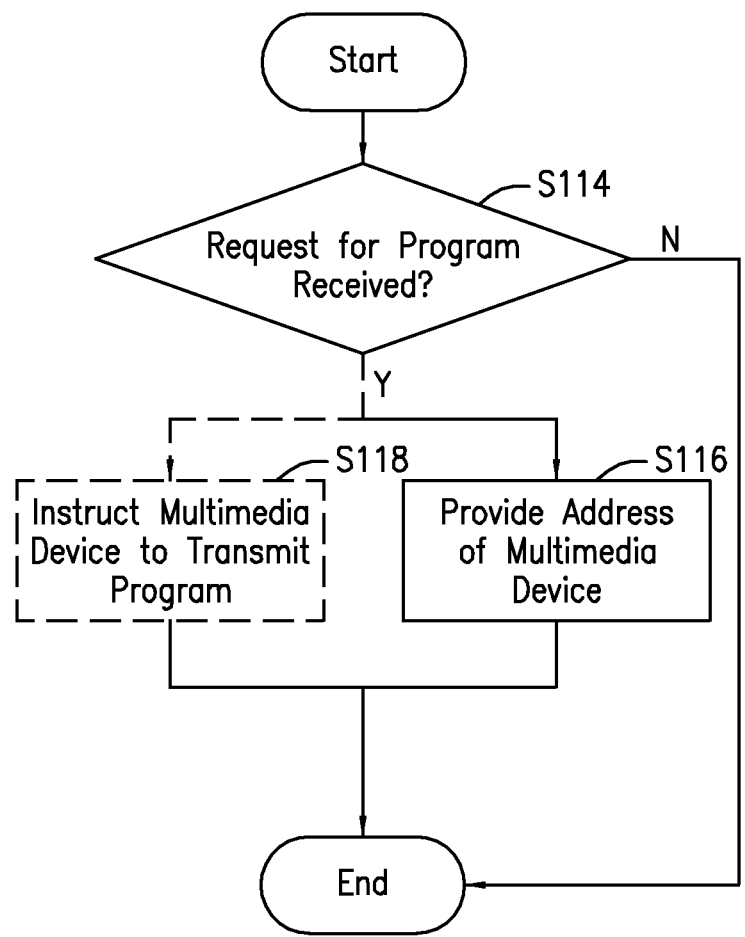
FIG. 5 is a flow chart of an exemplary process of responding to a request for a program that is not stored within the storage of the service provider network in accordance with principles of the present invention.

A flow chart of an exemplary process of responding to a request, from a multimedia device 16, for a program that is not stored within the network storage 19 of the service provider network 24 in accordance with principles of the present invention is shown with reference to FIG. 5. The service provider server 14 determines whether a subscription or request for a program that is not stored at the network storage 19 is received from a multimedia device 16 (block S114). According to some exemplary embodiments, if the request is received, the service provider server 14 provides, to the requesting multimedia device 16, an address, e.g., a Uniform Resource Locator (URL), Uniform Resource Identifier (URI) or a Transmission Control Protocol/Internet Protocol (TCP/IP) address, of the multimedia device 16 where at least a portion of the program is found (block S116). Using the provided address, the subscribing/requesting multimedia device 16 initiates and establishes a communication session with the multimedia device 16 where the at least a portion of the program is found. At least a portion of the program content is streamed to the subscribing/requesting multimedia device 16. According to other exemplary embodiments, if the request is received, the service provider server 14 instructs the multimedia device 16, which includes at least a portion of the program in local storage 22, to transmit the at least a portion of the program either directly to the subscribing/requesting multimedia device 16 or indirectly thereto by way of the service provider server 14 (block S118). When the multimedia device 16 is instructed to transmit the at least a portion of the program directly to the subscribing/requesting multimedia device 16, the multimedia device 16 may be provided with the address of the subscribing/requesting multimedia device 16. The multimedia device 16 then initiates and establishes a communication session with the subscribing/requesting multimedia device 16 and transmits the at least a portion of the program to the subscribing/requesting multimedia device 16 such that no portion of the program is transmitted to the service provider server 14, which reduces network traffic at the service provider server 14.

Figure 6:
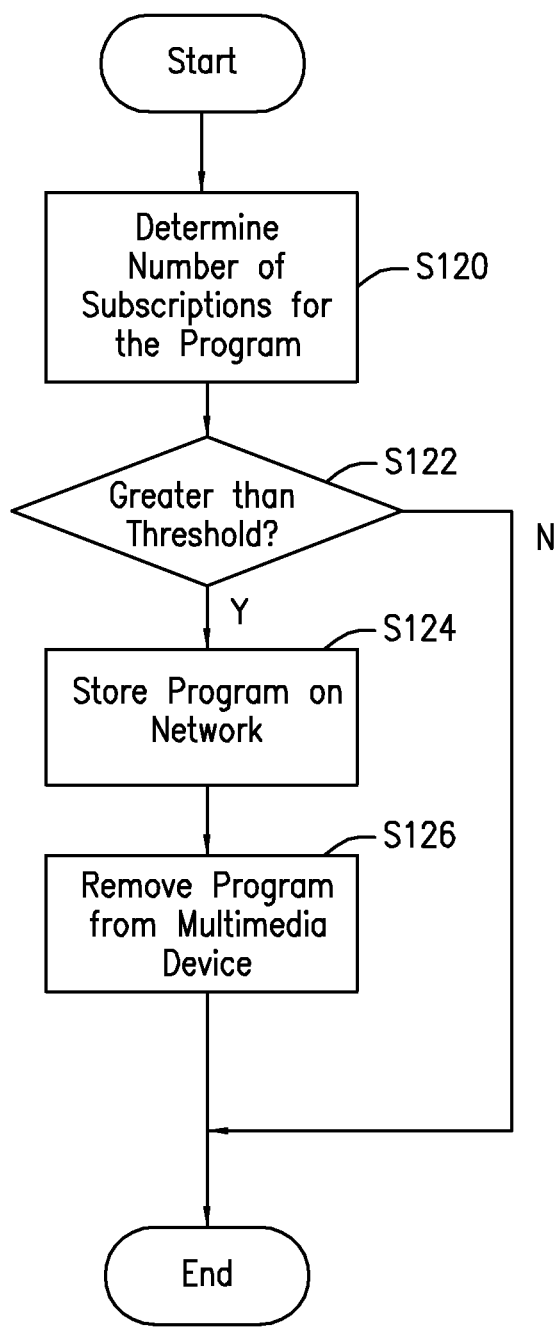
FIG. 6 is a flow chart of an exemplary process of transmitting a program that is stored at the multimedia device to the network storage of the service provider network in accordance with principles of the present invention.

A flow chart of an exemplary process of transmitting a program that is stored at the multimedia device 16 to the network storage 19 of the service provider server 14 in accordance with principles of the present invention is shown with reference to FIG. 6. The service provider server 14 determines a second number of subscriptions for the program (block S120). The service provider server 14 determines whether the second number is greater than a second predetermined threshold value (block S122). Similar to the first threshold value, the second threshold value may be determined based on a number of multimedia devices 16 that are connected to the service provider network 24, the storage capacity of the local storage 22 connected at the multimedia devices 16, the storage capacity in the network storage 19, a condition of the transport stream 18 between the multimedia devices 16 and the service provider network 24, and combinations thereof.

If the second number of subscriptions is greater than the second threshold value, the program is stored at the service provider network 24 on the network storage 19. It will be appreciated that storing the program at the service provider network 24 may include the service provider server 14 instructing a multimedia device 16, which has at least a portion of the program stored on the local storage 22 of the multimedia device 16, to transmit at least a portion of the program to the service provider server 14 for storage on the network storage 19 (block S124). According to some exemplary embodiments, the service provider server 14 may read a portion of the program from the local storage 22 of the multimedia device 16 for storing on the network storage 19. After the program or portion of the program is transmitted or read from the local storage 22, the service provider server 14 may transmit an instruction to the multimedia device 14 to delete, or mark for future deletion, the program or portion of the program. It will be appreciated that, according to some exemplary embodiments, the program or portion of the program on the local storage 22 may coexist with the program or portion of the program stored on the network storage 19. In this way, if a demand for a program increases at a later time, e.g., demand for a program may increase before a release of a corresponding sequel, the service provider network 24 adapts accordingly so that storage of the program is not wholly dependent on the multimedia devices 16 and the limited bandwidth that may be available between the multimedia devices 16 and the service provider network 24, but is instead, returned back to the network storage 19 of the service provider server 14 or shared between the network storage 19 of the service provider server 14 and the multimedia device 16.

According to some exemplary embodiments of the present invention, a dimensioning requirement, i.e., storage capacity requirement, of a network storage 19 of a service provider server 14 is reduced due to a reduced utilization of the network storage 19. The utilization of the network storage 19 may be reduced as a result of an increased utilization of the local storage 22. According to other exemplary embodiments of the present invention, the local storage of the multimedia devices 16 are utilized, which reduces capital expenditures for the service provider server 14 as compared with not implementing the invention and having to provide storage at the network provider level for even a single subscription of a program. In addition, if the multimedia device 16 is owned or subsidized by a service provider network operator, a greater portion of the service provider network operator's investment in the multimedia devices 16 is utilized because the "hybrid" approach of utilizing both the network storage 19 and the local storage 22 for storing program content does not allow the multimedia device 16 to simply remain idle when not in use and primarily receive program data. Instead, the storage and communication capabilities of the multimedia device 16 are utilized to both receive and transmit data.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of managing, by a service provider, a program stored within a service provider network, a plurality of multimedia devices being in communication with the service provider network, the method comprising:
   determining a first number of subscriptions for the program;
   when the first number of subscriptions is less than a first threshold,
      determining if the program is already recorded with the service provider network:
      when it is determined that the program is already recorded with the service provider network:
         transmitting at least a portion of the program to at least a first multimedia device having a subscription for the program;
         storing an address of the first multimedia device; and
         removing the program from the service provider network;
      when it is determined that the program is not already recorded with the service provider network:
         instructing the first multimedia device to record the program; and
         storing the address of the first multimedia device;
   determining a second number of subscriptions for the program is greater than a second threshold; and
   based on determining that the second number of subscriptions for the program is greater than the second threshold, receiving from the first multimedia device at least a portion of the program and storing the program within the service provider network, the second threshold being different from the first threshold.

2. The method according to claim 1, further comprising:
   storing an address of the first multimedia device; and
   responsive to a request for the program from a second multimedia device, providing the address of the first multimedia device to the second multimedia device, the first multimedia device having at least a portion of the program.

3. The method according to claim 1, wherein transmitting at least a portion of the program to at least the first multimedia device comprises:
   transmitting a first portion of the program to a second multimedia device having a subscription for the program; and
   transmitting a second portion of the program to a third multimedia device having a subscription for the program.

4. The method according to claim 3, wherein the first portion is identical to the second portion, the first portion and the second portion including an entirety of the program.

5. The method according to claim 3, wherein the first portion is different than the second portion.

6. The method according to claim 1, wherein storing the program within the service provider network comprises:
   receiving at least a portion of the program from at least one multimedia device having one of the first number of subscriptions for the program.

7. An apparatus for managing a program in a service provider network, the apparatus configured to communicate with the service provider network, a plurality of multimedia devices being in communication with the service provider network, the program being stored within the service provider network, the apparatus comprising:
   a processor configured to:
   determine a first number of subscriptions for the program;
   when the first number of subscriptions is less than a first threshold,
      determine if the program is already recorded with the service provider network;
      when it is determined that the program is already recorded with the service provider network:
         transmit at least a portion of the program to at least a first multimedia device having a subscription for the program;
         store an address of the first multimedia device; and
         remove the program from the service provider network;
      when it is determined that the program is not already recorded with the service provider network:
         instruct the first multimedia device to record the program; and
         store the address of the first multimedia device;
   determine a second number of subscriptions for the program is greater than a second threshold;
   based on determining that the second number of subscriptions for the program is greater than the second threshold, receive from the first multimedia device at least a portion of the program and store the program within the service provider network, the second threshold being different from the first threshold.

8. The apparatus according to claim 7, wherein the processor is further configured to:
   store, in the service provider network, an address of the first multimedia device.

9. The apparatus according to claim 8, wherein the processor is further configured to:
   receive, from a second multimedia device, a request for the program; and
   responsive to receiving the request, provide the address of the first multimedia device to the second multimedia device.

10. The apparatus according to claim 8, wherein the processor is further configured to:
    receive, from a second multimedia device, a request for the program; and
    responsive to receiving the request, instruct the first multimedia device to transmit the program to the second multimedia device.

11. The apparatus according to claim 7, wherein the processor is further configured to:

transmit a first portion of the program to a second multimedia device; and
transmit a second portion of the program to a third multimedia device.

12. The apparatus according to claim 7, wherein the processor is further configured to:
receive at least a portion of the stored program from at least one multimedia device having one of the first number of subscriptions for the program.

13. A method of managing, by a service provider, a program within a service provider network, the service provider network having a plurality of multimedia devices in communication with the service provider network, the method comprising:
determining a first number of subscriptions for the program;
when the first number of subscriptions is less than a first threshold,
determining if the program is already recorded with the service provider network;
when it is determined that the program is already recorded with the service provider network:
recording at least a portion of the program on at least a first multimedia device having a subscription for the program without storing the program at the service provider network; and
storing an address of the first multimedia device;
when it is determined that the program is not already recorded with the service provider network:
instructing the first multimedia device to record the program; and
storing the address of the first multimedia device;
determining a second number of subscriptions for the program is greater than a second threshold; and
based on determining that the second number of subscriptions for the program is greater than the second threshold, receiving from the first multimedia device at least a portion of the program and storing the program within the service provider network, the second threshold being different from the first threshold.

14. The method of claim 13, wherein storing the program at the service provider network comprises:
receiving at least a portion of the program from the first multimedia device having the subscription for the program.

15. The method of claim 13, further comprising:
storing an address of the first multimedia device; and
responsive to a request for the program from a second multimedia device, providing the address of the first multimedia device to the second multimedia device, the first multimedia device having at least a portion of the program.

16. The method of claim 13, further comprising:
responsive to a request for the program from a second multimedia device, instructing the first multimedia device to transmit at least a portion of the program to one of the second multimedia device and the service provider network.

17. The method of claim 13, further comprising:
when the second number is less than the second threshold, storing the program within the service provider network, wherein the second threshold is less than the first threshold.

* * * * *